United States Patent
Vojjala et al.

(10) Patent No.: US 8,547,118 B1
(45) Date of Patent: Oct. 1, 2013

(54) MULTI-FREQUENCY SCAN FOR MULTI-SENSOR ELECTRODE

(71) Applicants: Santhosh Kumar Vojjala, Bangalore (IN); Vibheesh Bharathan, San Jose, CA (US); Sai Prashanth Chinnapalli, San Jose, CA (US); Jijeesh Choorakottayil Gopinathan, Ernakulam (IN); Edward Grivna, Brooklyn Park, MN (US); David G. Wright, San Diego, CA (US)

(72) Inventors: Santhosh Kumar Vojjala, Bangalore (IN); Vibheesh Bharathan, San Jose, CA (US); Sai Prashanth Chinnapalli, San Jose, CA (US); Jijeesh Choorakottayil Gopinathan, Ernakulam (IN); Edward Grivna, Brooklyn Park, MN (US); David G. Wright, San Diego, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 13/724,516

(22) Filed: Dec. 21, 2012

(51) Int. Cl.
*G01R 27/26* (2006.01)

(52) U.S. Cl.
USPC .................. 324/681; 324/667; 324/686

(58) Field of Classification Search
USPC .......................... 324/681, 686, 667
See application file for complete search history.

(56) References Cited

U.S. PATENT DOCUMENTS

| | | | |
|---|---|---|---|
| 4,549,133 A * | 10/1985 | Metzner | 324/681 |
| 5,986,549 A * | 11/1999 | Teodorescu | 340/561 |
| 6,297,811 B1 | 10/2001 | Kent | |
| 7,006,078 B2 | 2/2006 | Kim | |
| 8,022,935 B2 | 9/2011 | Hotelling | |
| 8,059,015 B2 | 11/2011 | Hua et al. | |
| 8,068,097 B2 | 11/2011 | GuangHai | |
| 2004/0056845 A1 | 3/2004 | Harkcom | |
| 2011/0157030 A1 | 6/2011 | Xu | |
| 2011/0260741 A1* | 10/2011 | Weaver et al. | 324/686 |
| 2012/0044192 A1 | 2/2012 | Hsu | |

OTHER PUBLICATIONS

Cypress; Capsense Matrix Buttons using SmatSense; Jan. 5, 2012; 6 Pages.
Fischer, Dirk; Fujitsu; Capacitive Touch Sensors; Langen Germany; Jan. 12, 2010; 12 Pages.

* cited by examiner

*Primary Examiner* — Amy He

(57) ABSTRACT

An apparatus includes multiple capacitive sensing elements coupled through a filter network. The apparatus can include a control device configured to excite the capacitive sensing elements with different scanning frequencies and determine capacitances corresponding to each of the capacitive sensing elements based on sensor responses to the excitation of the capacitive sensing elements with the different scanning frequencies and a configuration of the filter network.

20 Claims, 9 Drawing Sheets

MULTI-FREQUENCY SCAN FOR MULTI-SENSOR ELECTRODE

TECHNICAL FIELD

This disclosure relates generally to electronic systems, and, more particularly, to a multi-frequency scan for a control device coupling to multiple capacitive sensors.

BACKGROUND

Many touch sensing devices utilize capacitive sensing technology to detect a presence of an object in contact with or proximate to a touch screen panel or button, for example, by identifying a change in capacitance in the touch screen panel or button associated with the presence of the object. There are two main types of capacitive touch sensing technology, mutual capacitance and self-capacitance. In mutual capacitive touch screen devices, every row-column pair in the touch screen panel may form a capacitive sensor that can be separately measured. For example, in measuring a 4-by-4 matrix of electrodes forming a mutual capacitive sensor array, each row can receive a separate excitation signal from a control device, and each column can output a separate signal corresponding to the capacitance of the respective capacitive sensors.

A self-capacitance sensing device can include one or more self-capacitive sensors to detect whether a conductive object is proximate to the self-capacitive sensor, for example, in a self-capacitive touch screen panel, each row and each column can be separate self-capacitive sensors. To detect a touch proximate to the self-capacitance device, the control device coupled to the self-capacitive sensors can separately sense a capacitance of each self-capacitive sensor. While self-capacitance and mutual-capacitance schemes can effectively resolve a touch condition on their corresponding touch screen panels or array of buttons, they both utilize a 1-to-1 sensor-to-pin ratio in their capacitance sensing operations. As a number of buttons supported by a control device increases, a number of pins that the control device utilizes to sense the capacitance of the capacitive sensors corresponding to the buttons also increases.

DETAILED DESCRIPTION

An electronic system can include multiple capacitive sensors forming an electrode coupled to a pin of a control device through a filter network. The electronic system can include a control device that can measure the capacitance present at the pin with different scanning frequencies and determine capacitances corresponding to each of the capacitive sensors based on sensor responses to the scan of the electrode with the different scanning frequencies and a configuration of the filter network. By coupling the capacitive sensors to a shared electrode with a filter network and then using multiple different frequency scans of the electrode, the control device can differentiate the presence of a touch between the capacitance sensors with a low number of pins. Embodiments are shown and described below in greater detail.

Figure 1:
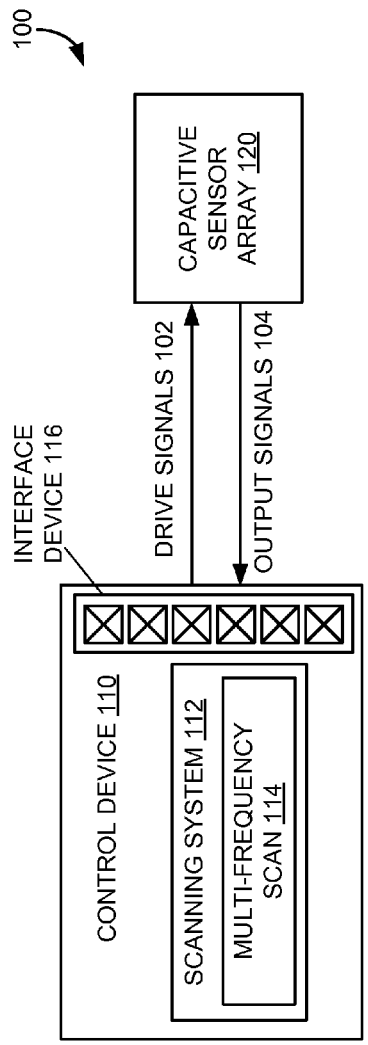
FIG. 1 is a block diagram example of a capacitive sensing system.

FIG. 1 is a block diagram example of a capacitive sensing system 100. Referring to FIG. 1, the capacitive sensing system 100 can include a capacitive sensor array 120 having sensor elements, for example, disposed as a two-dimensional sensing matrix or as individual buttons, to detect touches proximate to the capacitive sensor array 120. In some embodiments, the two-dimensional sensing matrix can be a self-capacitive sensing matrix or a mutual-capacitive sensing matrix having one capacitive sensor electrode per row and one capacitive sensor electrode per column. The touches on a surface of the capacitive sensor array 120 can be an object, such as a stylus, finger, palm, cheek, ear, or the like, in contact with or proximate to the capacitive sensor array 120. In some embodiments, the capacitive sensing system 100 can be implemented on various input surfaces, such as a touch screen, capacitive buttons, track pads, or other screen-less surfaces.

The capacitive sensing system 100 can include a control device 110 to control sensing operations associated with a capacitive sensor array 120. The control device 110 can include a scanning system 112 to generate excitation signals 102 and provide them to the capacitive sensor array 120 via an interface device 116. In some embodiments, the excitation signals 102 can be periodic, for example, to allow for multiple scan intervals for the capacitive sensor array 120. The interface device 116 can receive output signals 104 that correspond to a capacitance associate with capacitive sensors in the capacitive sensor array 120. In some embodiments, when the capacitive sensing system 100 performs self-capacitance measurements of the capacitive sensor array 120, the excitation signals 102 and output signals 104 can be the same signals and occur on the same pins of the control device 110.

The capacitive sensor array 120 can be configured to include various groups of multiple capacitive sensors coupled to or forming corresponding shared electrodes, for example, allowing the control device 110 to transmit excitation signals 102 to the groups of multiple capacitive sensors or receive output signals 104 from the groups of multiple capacitive sensors via pins in the interface device 116 that couple to the shared electrodes. This shared electrode coupling can allow the capacitive sensor array 120 to have a reduced number of pins in the interface device 116, while being able to transmit excitation signals 102 to the capacitive sensor array 120 and receive output signals 104 from the capacitive sensor array 120. Although FIG. 1 shows the interface device 116 included within the control device 110, in some embodiments, the interface device 116 can be separate from the control device 110, for example, implemented on a circuit board, flexible circuit board, wires in a cable.

In order to differentiate output signals 104 from the multiple capacitive sensors on a shared electrode, the capacitive sensor array 120 can be configured to couple the multiple capacitive sensors to respective shared electrodes through a network of filters, such as low-pass filters, band-pass filters, high-pass filters, or resonant circuits, and the control device 110 can perform multi-frequency scans 114. The scanning system 112 can perform the multi-frequency scans 114 and generate multiple excitation signals 102 with different frequencies for transmission over a shared electrode. The capacitive sensor array 120 can provide the output signals 104 to the interface device 116 of the control device 110 in response to the excitation signals 102 with different frequencies. In those embodiments where the capacitive sensor array 120 is measured for changes in self capacitance, the output signals 104 in response to the excitation signals 102 can be present on the same electrodes of sensor array 120, and connect to the interface device 116 of the control device 110 through the same physical pins. The scanning system 112 can determine capacitance values of the multiple capacitive sensors based on the output signals 104 generated in response to the excitation signals 102 with different frequencies and knowledge of the network of filters coupling the multiple capacitive sensors to the shared electrode. Additional embodiments of the capacitive sensor array 120 configurations and the multi-frequency scan 114 will be described below in greater detail.

Figure 2A:
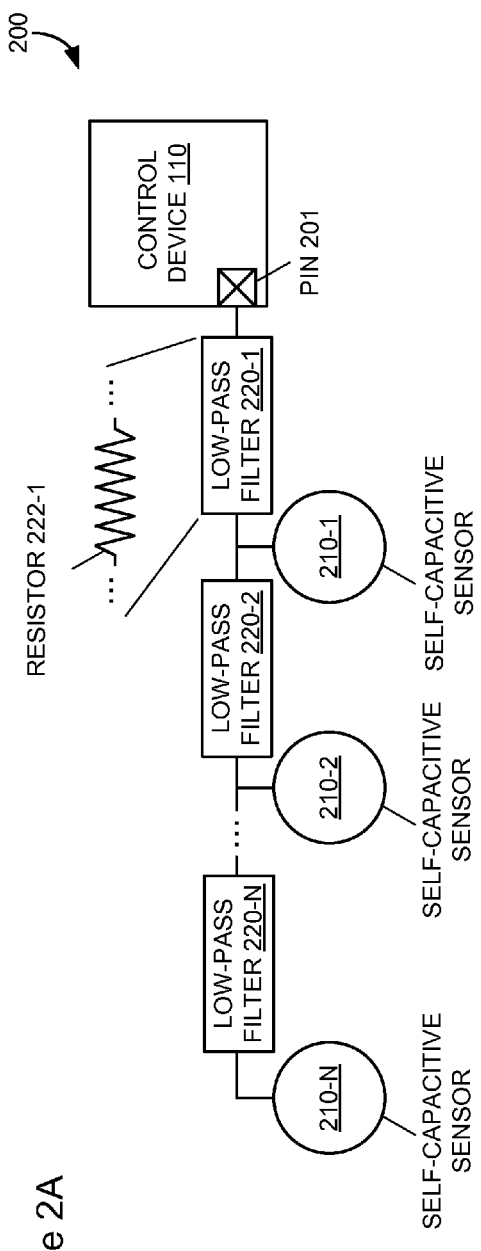
FIG. 2A is block diagram of an example self-capacitive sensor array implementation in a capacitive sensing system.

FIG. 2A is block diagram of an example self-capacitive sensor array implementation in a capacitive sensing system 200. Referring to FIG. 2A, the self-capacitive sensor array can include multiple self-capacitive sensors 210-1 to 210-N coupled to a pin 201 in the control device 110, for example, through a cascaded network of filters 220-1 to 220-N. In some embodiments, the low-pass filters 220-1 to 220-N can be high-pass filters configured to pass particular frequencies. The low-pass filters 220-1 to 220-N can be tuned to have a particular cutoff frequency for each corresponding self-capacitive sensor 210-1 to 210-N, which can allow the control device 110 to scan the self-capacitive sensors 210-1 to 210-N with different frequencies to determine the capacitance values for each of the self-capacitive sensors 210-1 to 210-N. In some embodiments, the filter 220-1 can be optional.

In some embodiments, the low-pass filters 220-1 to 220-N can be implemented with a resistor-inductor-capacitor (RLC) device or a resistor-capacitor (RC) device. Since the self-capacitive sensors 210-1 to 210-N can include an internal capacitance, for example, formed from a conductive material, such as copper plate, printed carbon, Indium Tin Oxide, carbon nanotubes, silver nanowires, etc., which can be utilized for sensing touches, the low-pass filters 220-1 to 220-N can include a resistive element, such as resistor 222-1 shown as comprising low-pass filter 220-1. The resistor 222-1 in combination with the capacitance in the self-capacitive sensor 210-1 can implement the low-pass filter 220-1. The cutoff frequency of the low-pass filter 220-1 can be tuned, for example, by altering the resistance of the resistor 222-1 or by changing the size and capacitance of self-capacitive sensor 220-1. Since each of the low-pass filters 220-1 to 220-N can have different cutoff frequencies, the control device 110 can perform multiple successive scans of a pin 201 with different frequencies, which can be set based on the cutoff frequencies of the low-pass filters 220-1 to 220-N.

Figure 2B:
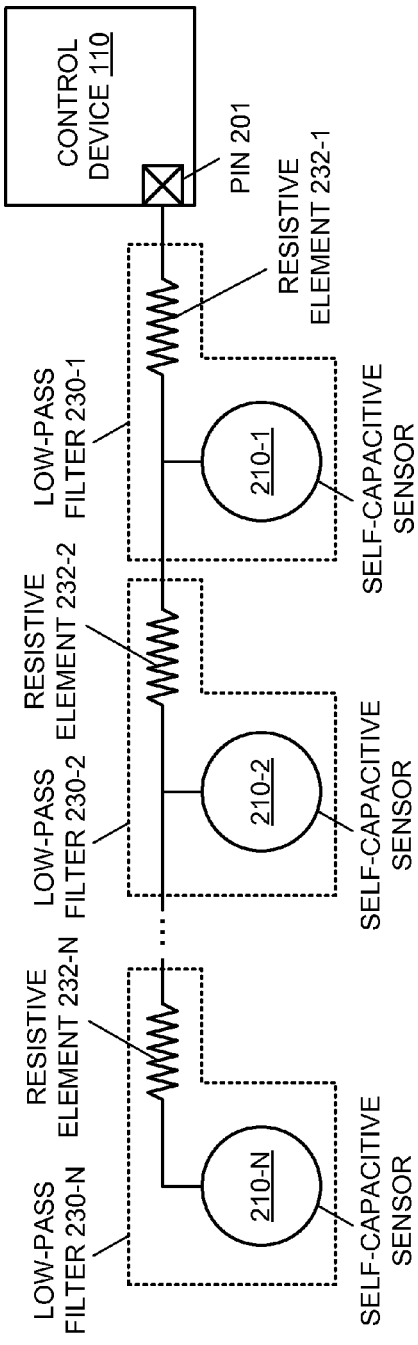
FIG. 2B is block diagram of another example self-capacitive sensor array implementation in a capacitive sensing system.

FIG. 2B is block diagram of an example self-capacitive sensor array implementation in a capacitive sensing system.

Referring to FIG. 2B, the capacitive sensing system in FIG. 2B is similar to the capacitive sensing system in FIG. 2A, except low-pass filters 230-1 to 230-N are shown as utilizing the self-capacitive sensors 210-1 to 210-N to form a part of the filter network. The low-pass filters 230-1 to 230-N can be implemented with a resistor-inductor-capacitor (RLC) device or a resistor-capacitor (RC) device. The combination of a resistive element 232-1 TO 232-N and corresponding capacitance of the self-capacitive sensors 210-1 to 210-N can form the low-pass filters 230-1 to 230-N.

In some embodiments, the resistance of one or more of the resistive elements 232-1 to 232-N in the low-pass filters 230-1 to 230-N can be implemented with a printed circuit board (PCB) trace. For example, in a single-layer printed circuit board implementation, printed carbon can be used for PCB traces, which can have a sheet resistance of 10-25 ohms per square. By varying a routed length and aspect ratio of the PCB traces formed in the printed carbon, the resistance of one or more of the resistive elements 232-1 to 232-N in the low-pass filters 230-1 to 230-N can be tuned. In another embodiment, traces can be formed of silver-impregnated ink printed on a polymer film, such as polyethylene terephthalate (PET). By varying a length and aspect ratio of the traces printed on a polymer film, for example, possibly with long and/or zig-zag patterns, the traces can connect capacitive sensors 210-1 to 210-N to each other and/or to the control device 201, while implementing the low-pass filters 230-1 to 230-N.

Figure 2C:
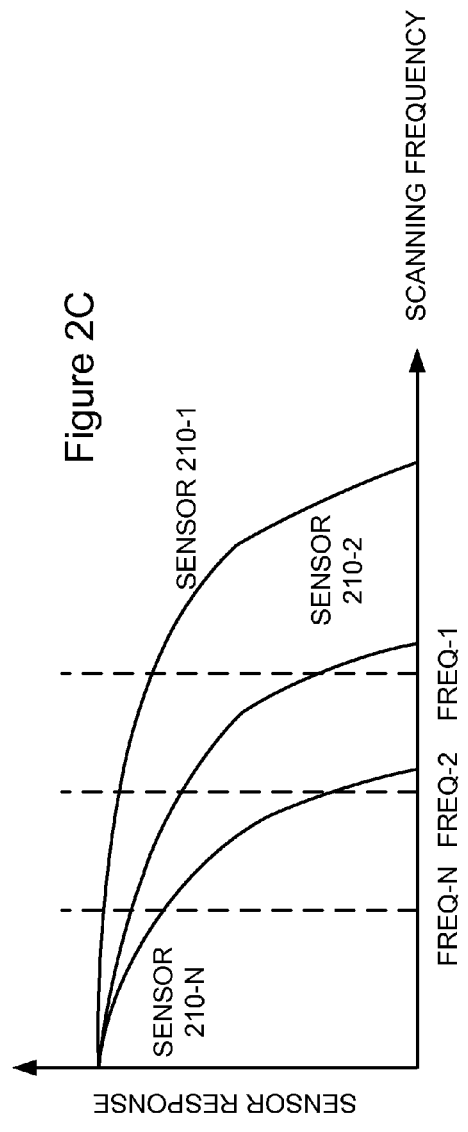
FIG. 2C is a graph showing an example multi-frequency scan of the self-capacitive sensor array shown in FIGS. 2A and 2B.

FIG. 2C is a graph showing the sensor response from an example multi-frequency scan of the self-capacitive sensor array 200 shown in FIGS. 2A and 2B. Referring to FIG. 2C, the graph shows a response of the self-capacitive sensors 210-1 to 210-N over various scanning frequencies from the control device 110. Each sensor response can reduce or increase with changes to the scanning frequency, for example, based on the cutoff frequencies of the filter network coupled to the capacitive sensors 210-1 to 210-N.

The control device 110 can select scanning frequencies for the capacitive sensors 210-1 to 210-N based on the cutoff frequencies corresponding to the filter network coupled to the capacitive sensors 210-1 to 210-N. For example, the scanning frequency FREQ-1 can be selected so that the filter network can allow a response of the sensor 210-1 to pass, but to limit or eliminate responses from the other sensors 210-2 to 210-N having lower cutoff frequencies. The control device 110 can determine which of the sensors 210-1 to 210-N are active based, at least in part, on sensor response on the electrode with the scan of the multiple frequencies.

TABLE 1

|  | FREQ-1 | FREQ-2 | FREQ-N | SENSOR ID |
|---|---|---|---|---|
| SENSOR 1 | ON | ON | ON | 1 |
| SENSOR 2 | OFF | ON | ON | 2 |
| SENSOR N | OFF | OFF | ON | N |

Table 1 shows an example of which capacitive sensor may be measured during each of the scan frequencies FREQ-1, FREQ-2, and FREQ-N. For example, when the scanning frequency is FREQ-1, sensor response can show whether a touch is present on the capacitive sensor 210-1, for example, the capacitive sensor 210-1 is active, while the presence of a touch on the capacitive sensors 210-2 to 210-N can be masked due to a blocking of capacitance measurement by the low pass filters. When the scanning frequency is FREQ-N, sensor response can show a touch presence from all of the capacitive sensors 210-1210-N. When previous scans of different frequencies, such as FREQ-1 and FREQ-2, detected no touch present on capacitive sensors 210-1 and 210-2, the sensor response to scanning frequency FREQ-N can indicate whether a touch is present on capacitive sensor 210-N. Since the control device 110 can scan the capacitive sensors 210-1 to 210-N coupled to a shared electrode through a filter network with multiple different frequencies, the control device 110 can differentiate between the capacitive sensors 210-1 to 210-N based on the cutoff frequencies in the filter network and the frequencies of the scan.

The control device 110 also can utilize a multiple threshold technique to determine which sensors are active based on a sensor response over a shared electrode, as shown in Table 2.

TABLE 2

ELECTRODE RESPONSE

| FREQ-1 | FREQ-2 | SENSORS ACTIVE |
|---|---|---|
| LOWER THAN FT1 | LOWER THAN FT1 | NONE |
| LOWER THAN FT1 | GREATER THAN FT1 | 1 |
| GREATER THAN FT1 | GREATER THAN FT1 | 2 |
| GREATER THAN FT1 | GREATER THAN FT2 | 1 AND 2 |

Table 2 shows an example response of two sensors coupled together through a filter network. Although FIGS. 2A and 2B show multiple capacitive sensors 210-1 to 210-N, for ease of describing the multiple threshold technique two sensors coupled together through a filter network is described. The two sensors can receive multiple scanning frequencies FREQ-1 and FREQ-2 and compare sensor responses to these multiple scanning frequencies FREQ-1 and FREQ-2 with multiple finger thresholds FT1 and FT2. In some embodiments, the second finger threshold FT2 can be greater than a first finger threshold FT1, while the scanning frequency FREQ-1 can be higher than the scanning frequency FREQ-2. When the electrode response is less than the first finger threshold FT1 in response to both scanning frequencies FREQ-1 and FREQ-2, the control device can determine that a first and second sensors are not active, for example, a touch is not present on the first and second sensors. When the sensor response is greater than the first finger threshold FT1 in response to scanning frequency FREQ-2 and less than the first finger threshold FT1 in response to scanning frequency FREQ-1, the control device can determine that a first sensor is active, for example, a touch is present on the first sensor, and second sensor is not active, for example, a touch is not present on the second sensor. When the sensor response is greater than the first finger threshold FT1 in response to both of the scanning frequencies FREQ-1 and FREQ-2, the control device can determine that a touch is not present on the first sensor and a touch is present on the second sensor. When the sensor response is greater than the first finger threshold FT1 in response to scanning frequency FREQ-1 and greater than the second finger threshold FT2 in response to scanning frequency FREQ-2, the control device can determine that a touch is present on both the first and second sensors.

Figure 3A:
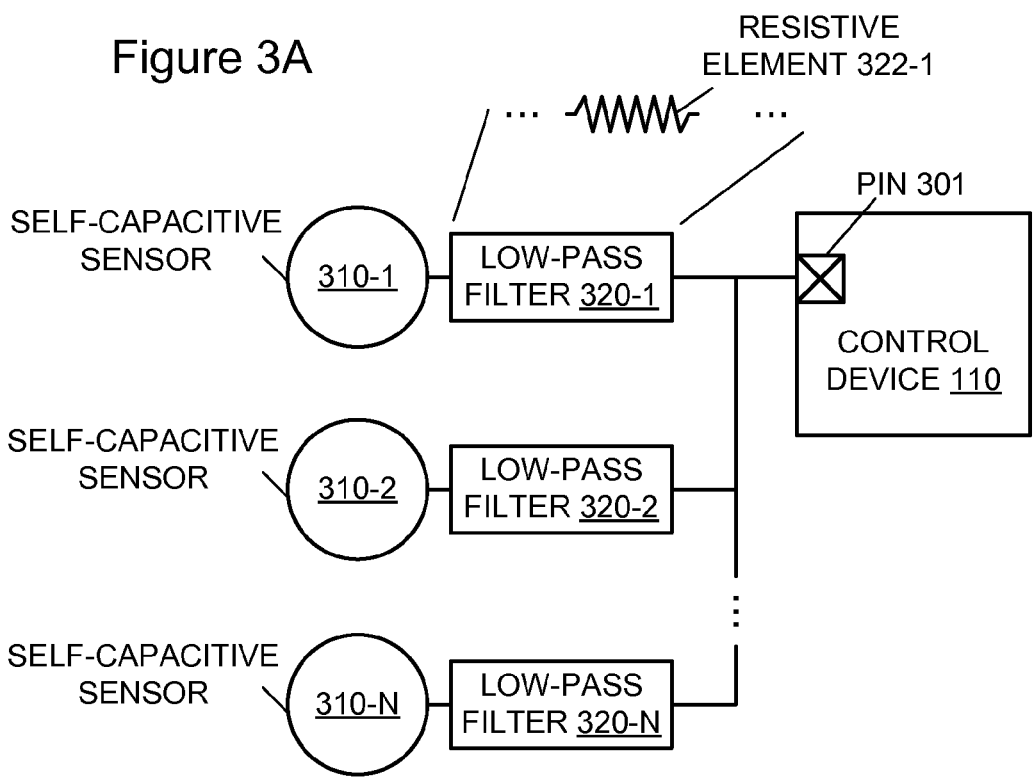
FIGS. 3A-3C are block diagrams of example self-capacitive sensor array implementations in a capacitive sensing system.
Figure 3B:
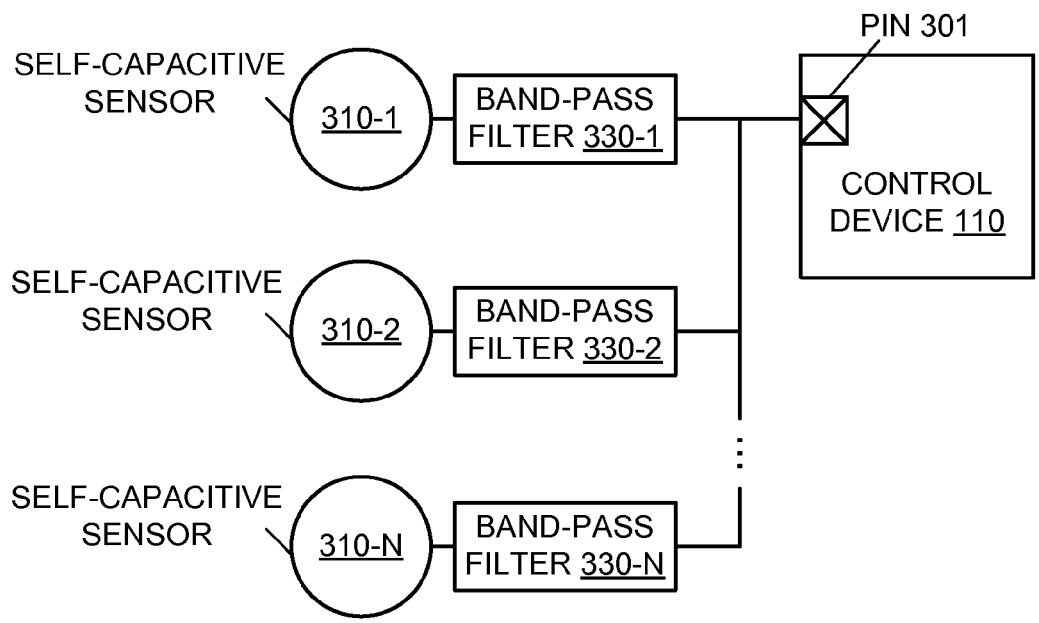
Figure 3C:
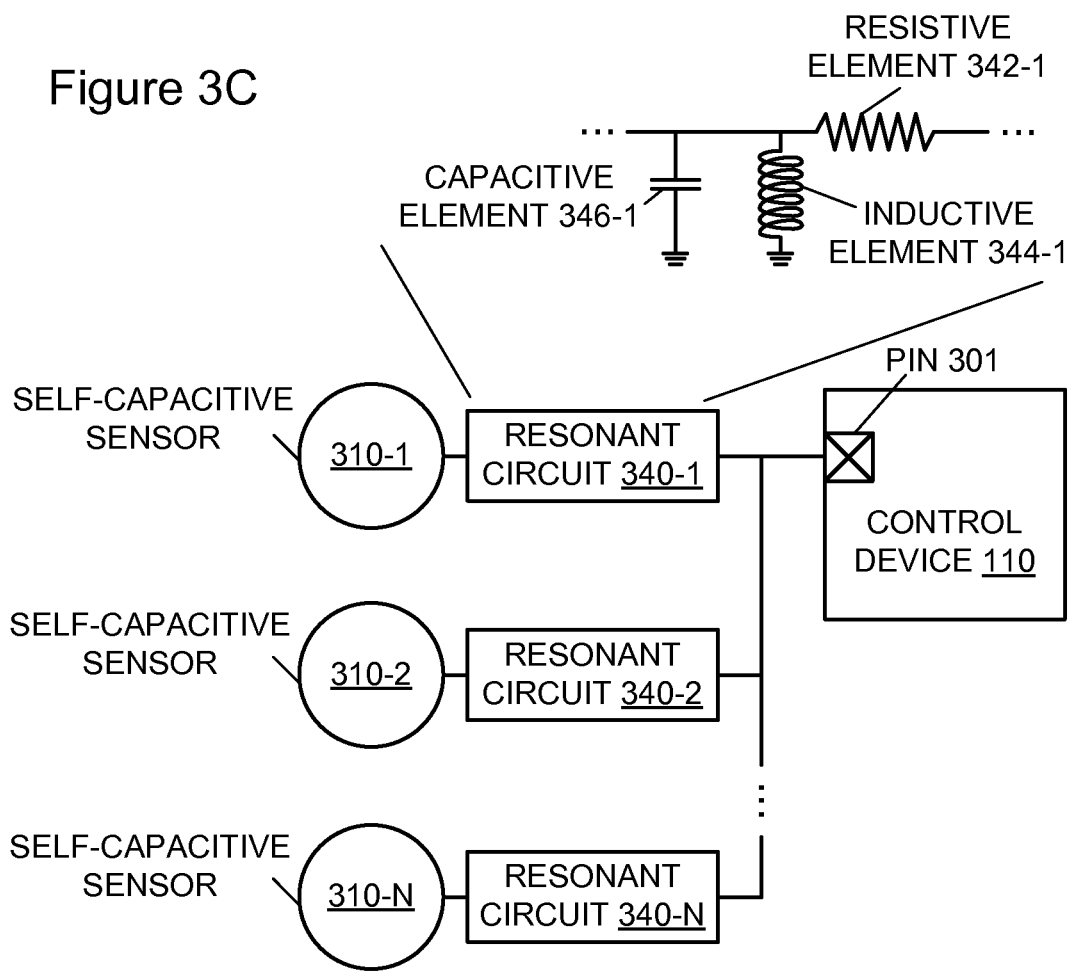

FIGS. 3A-3C are block diagrams of example self-capacitive sensor array implementations in a capacitive sensing system. Referring to FIG. 3A, the self-capacitive sensor array can include multiple self-capacitive sensors 310-1 to 310-N coupled to a pin 301 in the control device 110, for example, through a network of low-pass filters 320-1 to 320-N coupled in parallel. The low-pass filters 320-1 to 320-N can be independently tuned to have a particular cutoff frequency, which can allow the control device 110 to scan the self-capacitive sensors 310-1 to 310-N with different frequencies to determine the capacitance values for each of the self-capacitive sensors 310-1 to 310-N. Although FIG. 3A shows the low-pass filters 320-1 to 320-N being separate from the self-capacitive sensors 310-1 to 310-N, in some embodiments, the low-pass filters 320-1 to 320-N can include at least portion of the self-capacitive sensors 310-1 to 310-N, such as a capacitive element in the self-capacitive sensors 310-1 to 310-N.

In some embodiments, the low-pass filters 320-1 to 320-N can be implemented with a resistor-inductor-capacitor (RLC) device or a resistor-capacitor (RC) device. Since the self-capacitive sensors 310-1 to 310-N can include an internal capacitance, which can be utilized for sensing touches, the low-pass filters 320-1 to 320-N can include a resistive element, such as resistor 322-1 shown as comprising low-pass filter 320-1. The resistive element 322-1 in combination with the capacitance in the self-capacitive sensor 310-1 can implement the low-pass filter 320-1. The cutoff frequency of the low-pass filter 320-1 can be tuned, for example, by altering the resistance of the resistive element 322-1. The cutoff frequency of the low-pass filter 320-1 may also be tuned, for example, by altering the dimensions or dielectric of the sensor element 320-1, since these change the associated capacitance of the sensor. Since each of the low-pass filters 320-1 to 320-N can have different cutoff frequencies, the control device 110 can perform multiple successive scans of a pin 301 with different frequencies, which can be set based on the cutoff frequencies of the low-pass filters 320-1 to 320-N.

Although FIG. 3A shows low-pass filters 320-1 to 320-N coupling the self-capacitive sensors 310-1 to 310-N to a shared electrode, in some embodiments, multiple high-pass filters can replace the low-pass filters 320-1 to 320-N in coupling the self-capacitive sensors 310-1 to 310-N to a shared electrode. In a low-pass filtered system, a touch present on a button or self-capacitive sensor normally measured at the higher sensing frequency can mask the presence of touch on those sensors connected through lower cutoff frequency filters. In a high-pass filtered system, a touch present on a button or self-capacitive sensor normally measured at the lower sensing frequency can mask the presence of touch on those sensors connected through higher cutoff frequency filters.

Referring to FIG. 3B, the self-capacitive sensor array of FIG. 3B can be similar to the self-capacitive sensor array of FIG. 3A, except the multiple self-capacitive sensors 310-1 to 310-N can be coupled to a pin 301 in the control device 110 through a network of band-pass filters 330-1 to 330-N coupled in parallel. The band-pass filters 330-1 to 330-N can be a 2-pole filter, independently tuned to allow a particular frequency band to pass, which can allow the control device 110 to scan the self-capacitive sensors 310-1 to 310-N with different frequencies to determine the capacitance values for each of the self-capacitive sensors 310-1 to 310-N.

Although FIG. 3B shows the band-pass filters 330-1 to 330-N being separate from the self-capacitive sensors 310-1 to 310-N, in some embodiments, the band-pass filters 330-1 to 330-N can include at least portion of the self-capacitive sensors 310-1 to 310-N, such as a capacitive element in the self-capacitive sensors 310-1 to 310-N.

Referring to FIG. 3C, the self-capacitive sensor array can include multiple self-capacitive sensors 310-1 to 310-N coupled to a pin 301 in the control device 110, for example, through a network of resonant circuits 340-1 to 340-N coupled in parallel. The resonant circuits 340-1 to 340-N can be independently tuned to have a resonance or resonant frequency, which can be changed or modified with the presence of a conductive object in contact with or proximate to the corresponding self-capacitive sensors 310-1 to 310-N. The control device 110 can scan the self-capacitive sensors 310-1 to 310-N with different frequencies to determine the resonance or resonant frequency of the self-capacitive sensors 310-1 to 310-N and resonant circuits 340-1 to 340-N, which can indicate the capacitance values for each of the self-capacitive sensors 310-1 to 310-N.

In some embodiments, the resonant circuits 340-1 to 340-N can be an RLC circuit, for example, resonant circuit 340-1 can include a resistive element 342-1, an inductive element 344-1, and a capacitive element 346-1. The resonant frequency of the resonant circuits 340-1 to 340-N can be independently tuned to an initial value, for example, by altering an inductance of the inductive element 344-1 and/or a capacitance of the capacitive element 346-1. During operation, the resonant frequency of the resonant circuits 340-1 to 340-N can be modified based on the presence of the conductive object in contact with or proximate to the self-capacitive sensors 310-1 to 310-N. Although FIG. 3C shows the resonant circuits 340-1 to 340-N being separate from the self-capacitive sensors 310-1 to 310-N, in some embodiments, the resonant circuits 340-1 to 340-N can include at least portion of the self-capacitive sensors 310-1 to 310-N, such as a capacitive element in the self-capacitive sensors 310-1 to 310-N.

In some embodiments, the inductance of resonant circuits 340-1 to 340-N, such as inductive element 344-1, can be implemented with spiral or coupled traces, for example, printed on a printed circuit board (PCB) or a polymer film, such as polyethylene terephthalate (PET). By varying the spiral traces or core material of the inductive elements the resonant frequency of the resonant circuits 340-1 to 340-N can be tuned. The use of spiral traces to implement the inductive element can reduce manufacturing cost and complexity over the use of a discrete inductor component.

Figure 4A:
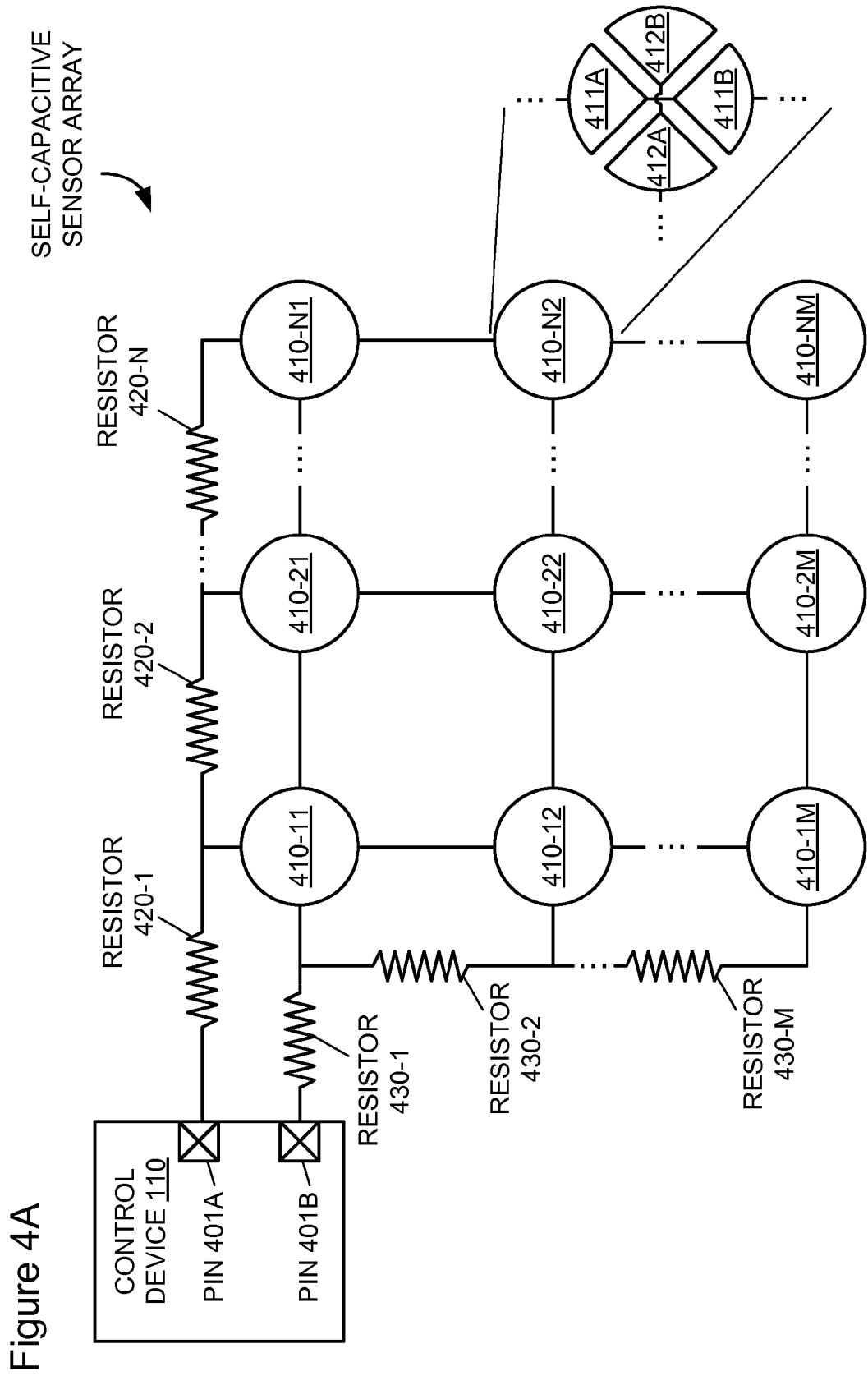
FIGS. 4A-4B are block diagrams of example self-capacitive sensor array implementations in a capacitive sensing system.
Figure 4B:
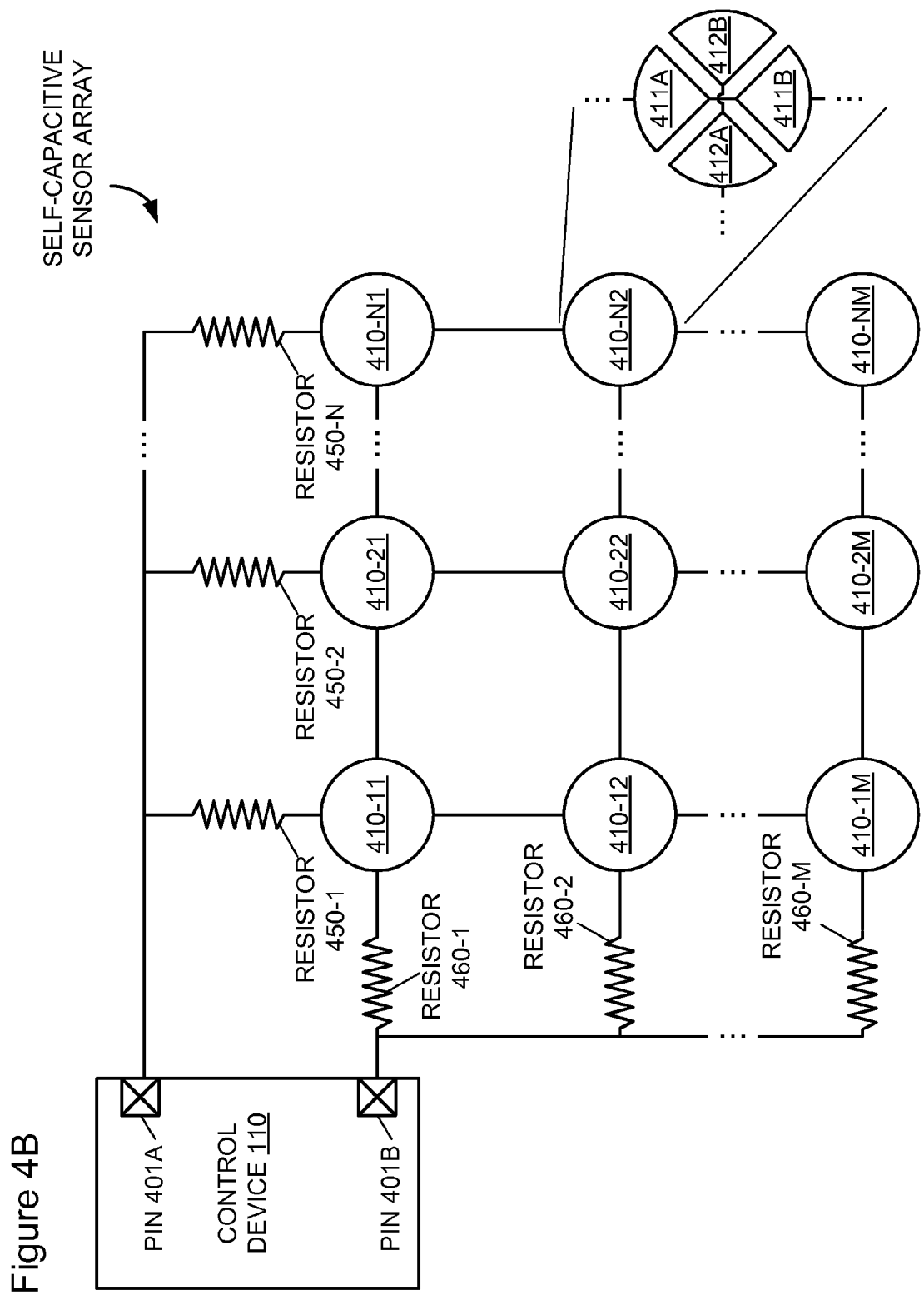

FIGS. 4A-4B are block diagrams of example two-dimensional self-capacitive sensor array implementations in the capacitive sensing system. Referring to FIGS. 4A and 4B, a self-capacitive sensor array can have multiple capacitive sensors 410-11 to 410-NM arranged in a row-column format with the first number after the dash "–" indicating a column number and the second number after the dash "–" indicating a row number. The columns of the capacitive sensors 410-11 to 410-NM can be coupled to a first common electrode, for example, with a cascaded low-pass filter network, shown as series coupled resistors 420-1 to 420-N in FIG. 4A or as parallel coupled resistors 450-1 to 450-N in FIG. 4B. In some embodiments, the inclusion of resistor 420-1 and 430-1 in the filter network can be optional. As discussed above in FIGS. 2A, 2B, and 3A, the coupling of the capacitive sensors 410-11 to 410-NM to a common electrode with corresponding low-pass filters can allow the control device 110 to scan the capacitive sensors 410-11 to 410-NM coupled to the common electrode with different scanning frequencies to determine touch presence associated with each of the capacitive sensors 410-11 to 410-NM. The control device can couple to the first common electrode via a pin 401A.

The rows of the capacitive sensors 410-11 to 410-NM coupled with a second common electrode, for example, with a cascaded low-pass filter network, shown as series coupled resistors 430-1 to 430-N in FIG. 4A or as parallel coupled resistors 460-1 to 460-N in FIG. 4B. In some embodiments, the inclusion of resistor 420-1 and 450-1 in the filter network can be optional. As discussed above in FIGS. 2A, 2B, and 3A, the coupling of the capacitive sensors 410-11 to 410-NM to a common electrode with corresponding low-pass filters can allow the control device 110 to scan the capacitive sensors 410-11 to 410-NM coupled to the common electrode with different scanning frequencies to determine activity associated with each of the capacitive sensors 410-11 to 410-NM. The control device can couple to the second common electrode via a pin 401B. Although FIGS. 4A and 4B show the capacitive sensors 410-11 to 410-NM coupling to common electrodes through low-pass filters, in some embodiments, the capacitive sensors 410-11 to 410-NM can couple to the common electrodes through high-pass filters, band-pass filters, or resonant circuits to detect a presence and location(s) of touches to the capacitive sensors 410-11 to 410-NM.

Each of the capacitive sensors 410-11 to 410-NM can include multiple self-capacitive sensor elements, each occupying the same approximate space or located near each other, but not connected to each other. For example, a capacitive sensor 410-N2 is shown in FIGS. 4A and 4B as including sensor elements 411A and 411B coupled to a shared column electrode and sensor elements 412A and 412B coupled to a shared row electrode. In some embodiments, the capacitive sensors 410-11 to 410-NM can have any number of sensor configurations, including interleaved spirals, interleaved diamond structure, split sensors, etc. When the capacitive sensors 410-11 to 410-NM are measured by the control device 110, the detected presence of touch on a column sensor and matching detection of presence on a row sensor may be used to activate a capacitive button located at the row/column coordinate within the matrix of capacitive sensors 410-11 to 410-NM.

Figure 5:
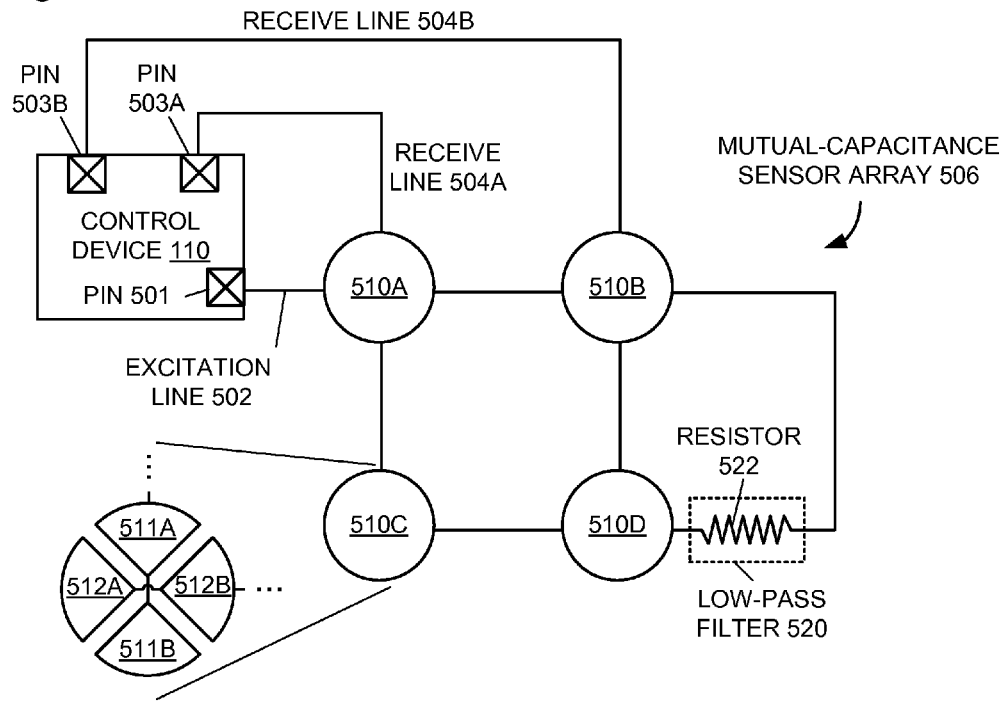
FIG. 5 is block diagram of an example mutual-capacitive sensor array implementation in a capacitive sensing system.

FIG. 5 is block diagram of an example mutual-capacitance sensor array 506 implementation in the capacitive sensing system. Referring to FIG. 5, the mutual-capacitance sensor array 506 can have an excitation line 502 for the control device 110 to provide an excitation signal to a row of capacitive sensors 510A-510B in the mutual-capacitance sensor array 506. The mutual-capacitance sensor array 506 can have receive lines 504A-504B to output signals coupled to the column electrodes of the capacitive sensors 510A-510D.

Since the rows of capacitive sensors 510A-510D in the mutual-capacitance sensor array 506 can be coupled with a low-pass filter 520, such as resistor 522, the control device 110 can provide multiple excitation signals with different frequencies to the mutual-capacitance sensor array 506 via pin 501 over the excitation line 502 and receive scan signals through the receive lines 504A-504B for multiple rows of the capacitive sensors 510A-510D. In some embodiments, the low-pass filter 520 can be formed with at least a portion of the sensor elements 510D. The control device 110 can differentiate between the capacitive sensors 510A and 510C in a first column based on the scan signals received at pin 503A over receive line 504A in response to the multiple different frequency excitation signals. The control device 110 can differentiate between the capacitive sensors 510B and 510D in a second column based on the scan signals received at pin 503B over receive line 504B in response to the multiple different frequency excitation signals. Although FIG. 5 shows the capacitive sensors 510A-510D coupling to common electrodes through low-pass filters, in some embodiments, the capacitive sensors 510A-510D can couple to the common electrodes through high-pass filters to detect a presence and location(s) of touches to the capacitive sensors 510A-510D.

Each of the capacitive sensors 510A-510D can include multiple mutual-capacitive sensor elements, each occupying the same approximate space or located near each other, but not connected to each other. For example, a capacitive sensor 510C is shown in FIG. 5 as including sensor elements 511A and 511B coupled to a shared column electrode and sensor elements 512A and 512B coupled to a shared row electrode. In some embodiments, the capacitive sensors 510A-510D can have any number of sensor configurations, including interleaved spirals, interleaved diamond structure, split sensors, etc. When the capacitive sensors 510A-510D are measured by the control device 110, the detected presence of touch on a column sensor and matching detection of presence on a row sensor may be used to activate a capacitive button located at the row/column coordinate within the capacitive sensors 510A-510D.

Figure 6:
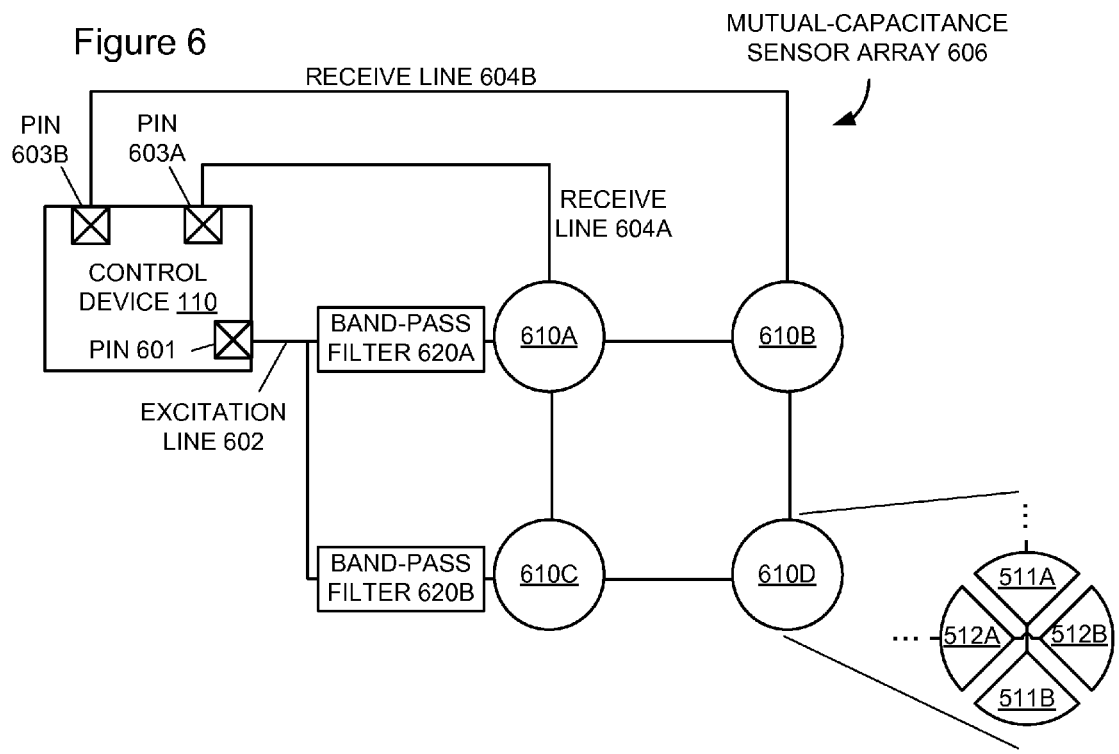
FIG. 6 is block diagram of another example mutual-capacitive sensor array implementation in a capacitive sensing system.

FIG. 6 is block diagram of another example mutual-capacitance sensor array 606 implementation in the capacitive sensing system shown in FIG. 1. Referring to FIG. 6, the mutual-capacitance sensor array 606 can have an excitation line 602 for the control device 110 to provide an excitation signal to rows of capacitive sensors 610A-610D in the mutual-capacitance sensor array 606. The mutual-capacitance sensor array 606 can have receive lines 604A-604B to output signals coupled to the column electrodes of the capacitive sensors 610A-610D.

Since the rows of capacitive sensors 610A-610D in the mutual-capacitance sensor array 606 can be coupled with band-pass filters 620A and 620B, the control device 110 can provide multiple excitation signals with different frequencies to the mutual-capacitance sensor array 606 via pin 601 over the excitation line 602 and receive scan signals through the receive lines 604A-604B for multiple rows of the capacitive sensors 610A-610D. In some embodiments, the band-pass filter 620A can be formed with at least a portion of the sensor elements 610A and 610B and band-pass filter 620B can be formed with at least a portion of the sensor elements 610C and 610D. The control device 110 can differentiate between the capacitive sensors 610A and 610C in a first column based on the scan signals received at pin 603A over receive line 604A in response to the multiple different frequency excitation signals. The control device 110 can differentiate between the capacitive sensors 610B and 610D in a second column based on the scan signals received at pin 603B over receive line 604B in response to the multiple different frequency excitation signals.

In some embodiments, wherein the filters feeding each row are replaced with band-pass filters each having no overlap in frequency response, it is possible to change from sequential measurement of the sensors using different excitation frequencies, to fully parallel measurement. This can be made possible through proper selection of the excitation waveform. In one embodiment, the excitation waveform may be changed from a single square wave to a mix of multiple sine waves. One sine wave can be produced for each row of sensor elements attached to a band-pass filter, with the frequency of each sine wave centered in the passband of one of the band-pass filters coupled to the row sensor elements in mutual capacitance sensor array 606. Because the source signals can be narrow-band, they may not include harmonics that can couple into the adjacent rows. The coupled signals received on the associated column sensor elements now include a similar mix of sine waves, with the received magnitude of each specific frequency providing indication of the relative capacitance present at each of the associated sensor elements within mutual capacitance sensor array 606.

Figure 7:
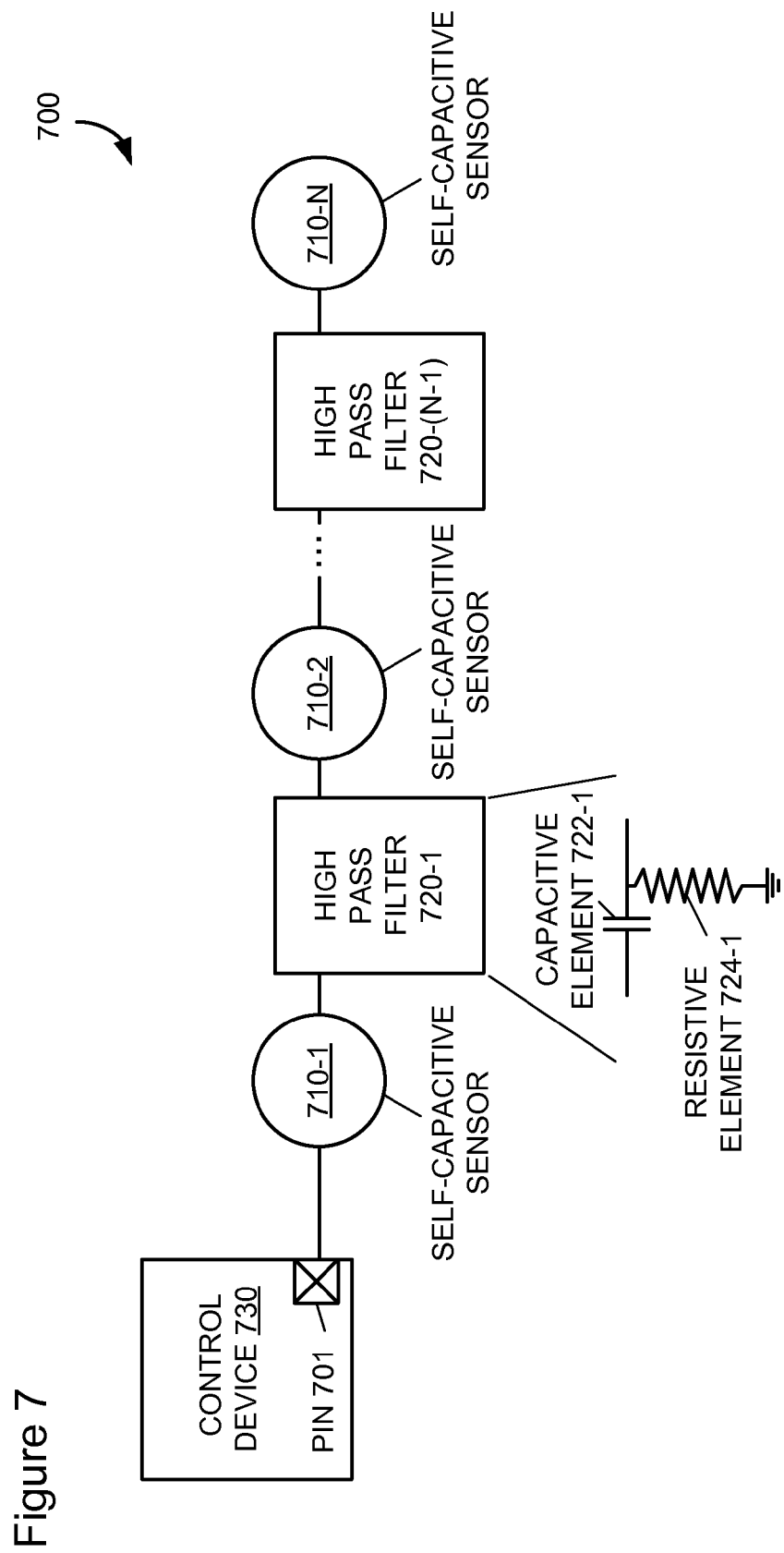
FIG. 7 is block diagram of another example self-capacitive sensor array implementation in a capacitive sensing system.

FIG. 7 is block diagram of another example self-capacitive sensor array 700 implementation in the capacitive sensing system. Referring to FIG. 7, the self-capacitive sensor array 700 can include multiple self-capacitive sensors 710-1 to 710-N coupled to a pin 701 of the control device 730, for example, through a cascaded network of high-pass filters 720-1 to 720-(N−1). The high-pass filters 720-1 to 720-(N−1) can be tuned to have a particular cutoff frequency, which can allow the control device 730 to scan the self-capacitive sensors 710-1 to 710-N with different frequencies to determine the capacitance values for each of the self-capacitive sensors 710-1 to 710-N.

In some embodiments, the high-pass filters 720-1 to 720-(N−1) can be implemented with a resistor-inductor-capacitor (RLC) device or a resistor-capacitor (RC) device. Since the self-capacitive sensors 710-1 to 710-N can include an internal capacitance, which can be utilized for sensing touches, the high-pass filters 720-1 to 720-(N−1) can include a capacitive element, such as capacitor 722-1, and a resistive element, such as resistor 724-1. The cutoff frequency of the high-pass filters 720-1 to 720-(N−1) can be tuned, for example, by altering the resistance of the resistors and/or by altering the capacitance of the series capacitor, or by varying the physical size and dielectric of the self-capacitance sensors. Since each of the high-pass filters 720-1 to 720-(N−1) can have different cutoff frequencies, the control device 730 can perform multiple successive scans of a pin 701 with different frequencies, which can be tuned based on the cutoff frequencies of the high-pass filters 720-1 to 720-(N−1). The control device 730 can utilize the successive scans similar to those described above with regard to the low-pass filter network implementation, but with different finger threshold(s) that can allow the control device 730 to identify when a touch is present on the capacitive sensors 710-1 to 710-N coupled to the pin 701 and differentiate between the capacitive sensors 710-1 to 710-N coupled to the pin 701.

Figure 8:
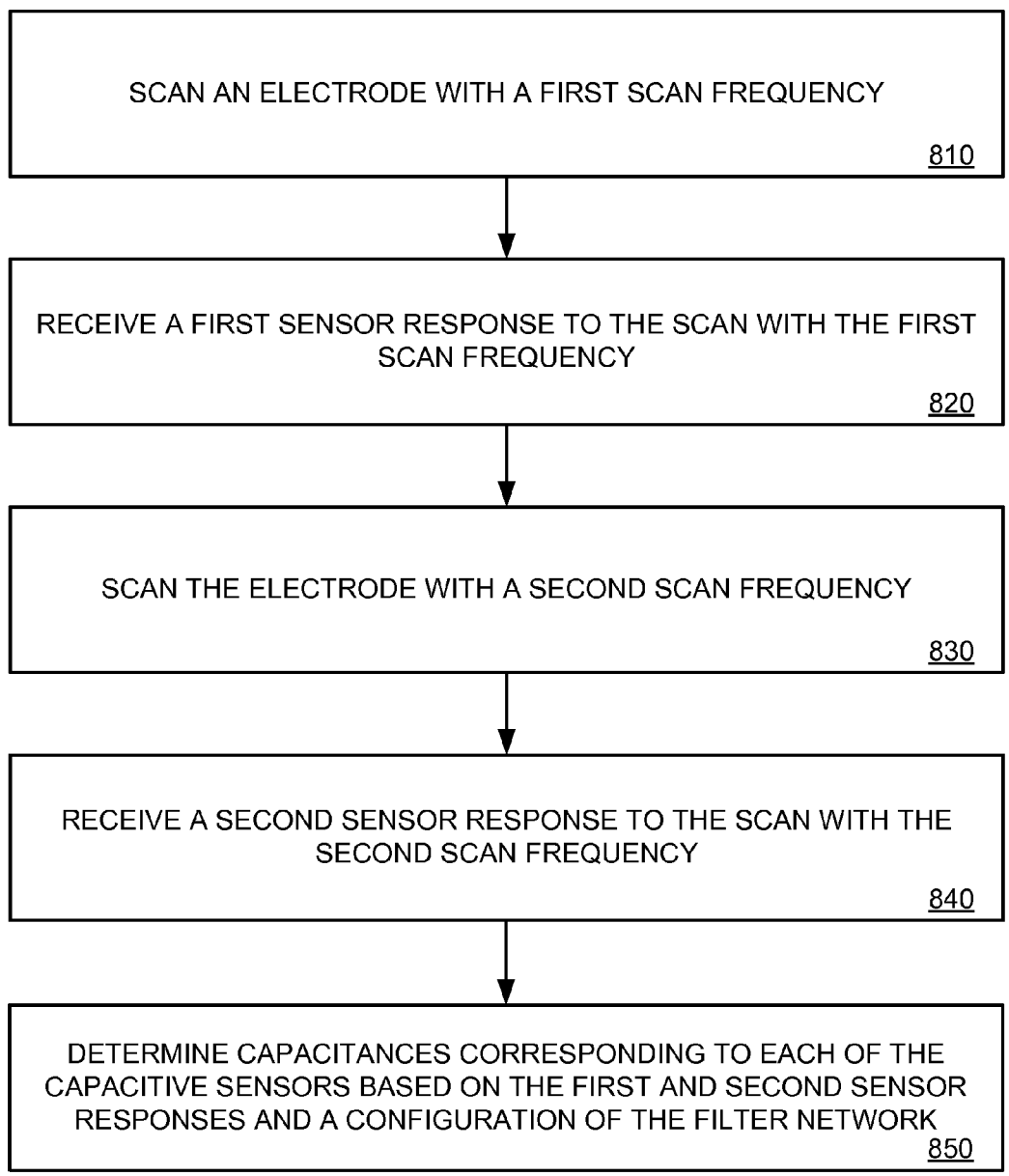
FIG. 8 is an example operational flowchart for multiple frequency scan of a capacitive sensing system.

FIG. 8 is an example operational flowchart for multiple frequency scan of a capacitive sensing system. Referring to FIG. 8, at a block 810, a control device can scan an electrode coupled to multiple capacitive sensors through a filter network with a first scan frequency, and at a block 820, the control device can receive a first sensor response to the scan with the first scan frequency. The filter network can include multiple low-pass filters, band-pass filters, resonant circuits, or high-pass filters, which can be set to have different cutoff frequencies, resonant frequencies, or pass-band frequencies. In some embodiments, the low pass filters in the filter network can be arranged in series in a cascade configuration. In other embodiments, the filters of the filter network can be arranged in parallel between the capacitive sensors and the control device. The first scan frequency and the first sensor response can correspond to (or be bounded by) at least one of the cutoff frequencies corresponding to one of the capacitive sensors.

At a block 830, the control device can scan the electrode with a second scan frequency, and at a block 840, the control device can receive a second sensor response to the scan with the second scan frequency. The second scan frequency and the second sensor response can correspond to (or be bounded by) at least another one of the cutoff frequencies corresponding to one of the capacitive sensors.

At a block 850, the control device can determine capacitances corresponding to each of the capacitive sensors based on the first and second sensor responses and a configuration of the filter network. In some embodiments, the configuration of the filter network can identify the cutoff frequencies for each of capacitive sensors.

In some embodiments, the waveshape of the excitation signals used to measure the capacitances of the self-capacitance and mutual-capacitance sensor elements does have an impact on the how the system responds, or how the sensing may be performed. For example, when rectangular excitation pulses are used, they can include significant energy not only at the fundamental frequency of the square wave, but also at the harmonics of that fundamental frequency. The upper harmonics of a sensing signal directed toward a low-pass filtered set of sensor elements can receive the energy from the fundamental frequency, since the harmonic content can be above the cutoff frequency of the filter, while the energy in these same harmonics may well fall into a passband of some of the alternate sensor elements on the same electrode. Thus, use of band-pass filters or harmonic-limited excitation signals may provide for a delineation of touch response across multiple sensor elements distributed across a single electrode.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

One of skill in the art will recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

What is claimed is:

1. An apparatus comprising:
   multiple capacitive sensing elements coupled through a filter network; and
   a control device configured to excite the capacitive sensing elements, through a pin of the control device, with different scanning frequencies and determine capacitances corresponding to each of the capacitive sensing elements based on sensor responses to the excitation of the capacitive sensing elements with the different scanning frequencies and a configuration of the filter network.

2. The apparatus of claim 1, wherein the filter network includes a plurality of resistive elements having resistances configured to form low-pass filters with corresponding capacitive sensing elements.

3. The apparatus of claim 2, wherein the resistive elements have resistance values configured to set cutoff frequencies for the corresponding capacitive sensing elements, and wherein the control device is configured to determine the capacitances corresponding to each of the capacitive sensing elements based on the cutoff frequencies for the corresponding capacitive sensing elements.

4. The apparatus of claim 1, wherein the control device is configured to serially output excitation signals having the different scanning frequencies on a transmit line coupled to the capacitive sensing elements, receive scan signals over multiple receive lines in response to the excitation signals, and wherein the scan signals have a magnitude corresponding to capacitance values of the capacitive sensing elements coupled between the transmit line and the receive lines.

5. The apparatus of claim 4, wherein the filter network includes a resistive element having a resistance coupled in series between two rows of the capacitive sensing elements.

6. The apparatus of claim 1, wherein the filter network includes multiple low-pass filters coupled in series or in parallel to the respective capacitive sensing elements.

7. The apparatus of claim 1, wherein the filter network includes multiple band-pass filters coupled in series or in parallel to the respective capacitive sensing elements.

8. A method comprising:
   exciting with different scan frequencies, by a control device through a pin of the control device, multiple capacitive sensing elements coupled through a filter network; and
   detecting, by the control device, whether a conductive object is proximate to each of the capacitive sensing elements based on sensor responses to the exciting of the capacitive sensing elements with the different scanning frequencies and a configuration of the filter network.

9. The method of claim 8, wherein the filter network includes a plurality of resistive elements having resistances configured to form low-pass filters with corresponding capacitive sensing elements.

10. The method of claim 9, wherein the resistive elements have resistance values configured to set cutoff frequencies for the corresponding capacitive sensing elements, and wherein the detecting whether the conductive object is proximate to each of the capacitive sensing elements further comprises determining capacitances corresponding to each of the capacitive sensing elements based on sensor responses to the exciting of the capacitive sensing elements and the cutoff frequencies for the corresponding capacitive sensing elements.

11. The method of claim 8, wherein exciting the capacitive sensing elements further comprising:
- serially outputting, by the control device, excitation signals having the different scanning frequencies on a transmit line; and
- receiving, by the control device, response signals over multiple receive lines in response to the excitation signals, wherein the response signals have a magnitude corresponding to capacitance values of the capacitive sensing elements coupled between the transmit line and the receive lines.

12. The method of claim 11, wherein the filter network includes a resistive element having a resistance coupled in series between two rows of the capacitive sensing elements.

13. The method of claim 8, wherein the filter network includes multiple low-pass filters coupled in series or in parallel to the respective capacitive sensing elements.

14. The method of claim 8, wherein the filter network includes multiple band-pass filters coupled in series or in parallel to the respective capacitive sensing elements.

15. An apparatus comprising a memory device storing instructions configured to cause a processing device to perform operations comprising:
- exciting, through a pin, multiple capacitive sensing elements with different scanning frequencies, wherein the multiple capacitive sensing elements are coupled through a filter network; and
- measuring capacitances corresponding to each of the capacitive sensing elements based on sensor responses to the excitation of the capacitive sensing elements with the different scanning frequencies and a configuration of the filter network.

16. The apparatus of claim 15, wherein the filter network includes a plurality of resonance circuits coupling the capacitive sensing elements, and wherein the resonance circuits are configured to have resonant frequencies corresponding to capacitances of the capacitive sensing elements.

17. The apparatus of claim 16 further comprising detecting whether a conductive object is proximate to each of the capacitive sensing elements based on a presence of changes in the resonant frequencies of the resonance circuits.

18. The apparatus of claim 15, wherein the filter network includes a plurality of band-pass filters configured to couple the capacitive sensing elements.

19. The apparatus of claim 15, wherein the filter network includes multiple filters cascaded in series coupling the respective capacitive sensing elements.

20. The apparatus of claim 15, wherein the filter network includes multiple filters coupled in parallel with the respective capacitive sensing elements.

\* \* \* \* \*